United States Patent [19]

Schauss et al.

[11] Patent Number: 4,970,184

[45] Date of Patent: Nov. 13, 1990

[54] CATALYST FOR THE POLYMERIZATION OF ETHYLENE, ITS PREPARATION AND THE USE OF THE RESULTING ETHYLENE POLYMERS FOR THE PRODUCTION OF FILMS EXHIBITING LITTLE BLOCKING

[75] Inventors: Eckard Schauss, Heuchelheim; Heinz Vogt, Ludwigshafen; Rainer Hemmerich, Gruenstadt; Guenther Schweier, Friedelsheim; Rudolf Mueller-Mall, Neuhofen, all of Fed. Rep. of Germany

[73] Assignee: Basf Aktiengesellschaft, Ludwigshafen, Fed. Rep. of Germany

[21] Appl. No.: 346,899

[22] Filed: May 3, 1989

[30] Foreign Application Priority Data

May 6, 1988 [DE] Fed. Rep. of Germany ....... 3815486

[51] Int. Cl.$^5$ .................... C08F 4/649; C08F 4/656
[52] U.S. Cl. .................................. 502/107; 502/111; 502/112; 502/120; 502/125; 526/125
[58] Field of Search ............... 502/107, 111, 120, 112, 502/125

[56] References Cited

U.S. PATENT DOCUMENTS 4,405,495  9/1983  Lee et al. ................... 502/120 X
4,477,587  10/1984  Band ............................ 502/125 X

FOREIGN PATENT DOCUMENTS 043220  1/1982  European Pat. Off. .
212519  3/1987  European Pat. Off. .
225452  6/1987  European Pat. Off. .
264733  4/1988  European Pat. Off. .

Primary Examiner—Patrick P. Garvin
Attorney, Agent, or Firm—Keil & Weinkauf

[57] ABSTRACT

A catalyst for the copolymerization of ethylene by the gas-phase fluidized-bed method is prepared by a process in which a titanium-containing and magnesium-containing active component, reacted with an alcohol as a complexing agent, is applied to a finely divided silica from homogeneous solution, in the presence of a polysiloxane, by evaporating the solvent, and the resulting homogeneous catalyst intermediate is then preactivated by treatment with the alkylaluminum compound and the Lewis base in an inert hydrocarbon solution, and the copolymers prepared using the above catalyst are employed for the production of films exhibiting little blocking.

19 Claims, No Drawings

CATALYST FOR THE POLYMERIZATION OF ETHYLENE, ITS PREPARATION AND THE USE OF THE RESULTING ETHYLENE POLYMERS FOR THE PRODUCTION OF FILMS EXHIBITING LITTLE BLOCKING

The present invention relates to a process for the preparation of a catalyst for the copolymerization of ethylene by the gas-phase fluidized-bed method using an active component consisting of a titanium-containing and magnesium-containing compound, a polysiloxane, a carrier comprising finely divided silica, an alkylaluminum compound and a Lewis base.

Processes of this type give copolymers of ethylene with α-olefins, which have densities of from 0.90 to 0.94 g/cm$^3$ and can be processed to give improved finished articles having good technical properties. Particularly for film production, desirable ethylene polymers are those which have a low content of polymers which are soluble in organic solvents, such as n-heptane or xylene, with the result that, for example, blocking of films consisting of such ethylene polymers can be substantially avoided.

It is known that these requirements can be met by preparing copolymers of ethylene with small amounts of hydrocarbon-soluble polymers by copolymerization of the monomers with certain catalyst systems. The known catalyst systems are obtained by reacting a certain titanium-containing catalyst component with a defined complex compound of a Lewis base such as a siloxane (cf. EP-A-225 452), esters, ketones, oxacycloalkanes, amines (cf. DE-A-35 38 577 to 35 38 580) or aliphatic ethers (cf. EP-A-212 519) and a certain aluminum compound.

These catalysts meet most requirements for the preparation of low density polymer grit suitable for the production of films, but the morphological properties of the polymers still prove to be disadvantageous. Particularly for technical control of the gas-phase fluidized-bed process, these catalysts give too large an amount of very fine particles in the polymerization, which leads to blockage of the recycled gas systems and necessitates deposition means, such as cyclones or filters; another considerable disadvantage is the low bulk density of the polymer and the change in the particle size, the particle size distribution and/or the particle shape when the density and/or the melt flow index of the polymer are varied.

In this context, EP-A-43220 describes a certain catalyst system which permits the production of a polymer particle size distribution which is particularly advantageous for the gas-phase fluidized-bed process. The catalyst productivity of the said systems, which is regarded as relatively high, is nevertheless lower than the above-mentioned productivities by a factor of 2. Furthermore, the special sieving required to remove a silica gel fraction in order to obtain the desired polymer morphology appears to be indispensable and to give rise to large amounts of silica gel as waste.

It is an object of the present invention to provide a catalyst for the gas-phase fluidized-bed process, which permits the preparation of low density ethylene polymers containing small soluble polymer fractions and at the same time having good morphology.

It is a further object of the present invention to provide a catalyst for the gas-phase fluidized-bed process, which has good pourability in combination with high productivity, the disadvantages mentioned at the outset with regard to the polymer bulk density and particle size being substantially avoided.

It is a further object of the present invention to provide a catalyst for the copolymerization of ethylene, which gives ethylene polymers which are suitable for the production of films exhibiting little blocking.

The copolymerization of ethylene is the preparation of ethylene polymers having a density of from 0.89 to 0.95, in particular from 0.90 to 0.94, g/cm$^3$, determined according to DIN 53,479, with minor amounts of $C_3$–$C_8$-alpha-monoolefins, in particular $C_4$–$C_6$-alpha-monoolefins, by copolymerization of the monomer or monomers at from 30° to 200° C., in particular from 50° to 120° C., under from 1 to 200, in particular from 5 to 60, bar. The copolymerization should be carried out by the known gas-phase fluidized-bed process using an active component consisting of a titanium-containing and magnesium-containing compound, a polysiloxane, a carrier comprising finely divided silica, an alkylaluminum compound and a Lewis base. Processes of this type using the above catalyst systems are sufficiently well known to require no detailed explanation. In this context, reference may be made to the literature cited at the outset and in addition to the following publications: "Ullmanns Encyclopädie der technischen Chemie, 4 (1980), (19), page 186, Verlag Chemie GmbH, D-6940 Weinheim, and Encyclopedia of Polymer Science and Engineering, 2 (1986), (6), pages 429–454 and EP-A-264 733.

In the novel process, the catalyst according to the invention should be prepared by a procedure in which a titanium-containing and magnesium-containing active component, reacted with an alcohol as a complexing agent, is applied to the silica from homogeneous solution, in the presence of the polysiloxane, by evaporating the solvent, and the resulting homogeneous catalyst intermediate is then preactivated by treatment with the alkylaluminum compound and the Lewis base in an inert hydrocarbon solution. In a preferred procedure, during evaporation of the solvent under inert gas or under reduced pressure, up to 50 percent by volume of the solvent is removed at from 60° to 80° C. and the remainder is removed down to a final reduced pressure of 5 mbar at not more than 50° C. The procedure is dependent on the boiling point of the solvent. If, for example, the boiling point of the solvent is within the stated limits inert gas should be employed, but if the boiling point is above 80° C. reduced pressure should be used. Another preferred process is one in which the solvent is a saturated oxahydrocarbon, such as di-n-butyl ether or tetrahydrofuran. Furthermore, a process in which the carrier silica has a mean specific surface area of from 200 to 400 m$^2$/g, a mean particle diameter of from 5 to 200 μm and a mean specific pore volume of from 1.5 to 2.0 cm$^3$/g and a process in which the Lewis base is a silane of the formula $R^1{}_m Si(OR^2)_{4-m}$, where m is from 0 to 4 and $R^1$ and $R^2$ are each a $C_1$–$C_{12}$-hydrocarbon radical, or a dimeric siloxane of the general formula $(R^1)$—Si—O—Si$(R^2)$, where $R^1$ and $R^2$ have the abovementioned meanings, are preferred.

Another preferred process is one in which the polysiloxane is of the general formula $$R^1O\!-\!\!\left[\begin{array}{c}R^2\\|\\Si\!-\!O\\|\\R^3\end{array}\right]_n\!\!-\!R^4$$

where $R^1$, $R^2$, $R^3$ and $R^4$ may be identical or different and are one or more methyl radicals or one or more phenyl radicals and n is an integer of from 10 to 3,000.

Regarding the novel embodiment of the process, the following may be stated specifically:

In the present invention, a titanium-containing compound of the general formula $$TiCl_3 . nAlCl_3$$

where n is from 0 to 0.5, preferably from 0.2 to 0.4, in particular from 0.31 to 0.35, and a magnesium-containing compound of the general formula $$MgX_2$$

where X is Cl, Br or iodine, are used as active components. A preferably used magnesium component is anhydrous $MgCl_2$.

The abovementioned active components are complexed with alcohols of the general formula $$R\!-\!OH$$

where R is n aliphatic $C_2$–$C_{14}$-hydrocarbon radical, by a conventional method (e.g. according to D. C. Bradley and M. L. Mehta, Can. J. Chem., 40 [1962], 1710–1713). The complexes can either be prepared in situ, for example from $MgCl_2$ and 2-ethylhexanol in tetrahydrofuran as a solvent, or used in isolated form, for example as $TiCl_3$. ⅓ $AlCl_3$ . 5.33 isopropanol.

The solvent to be used is a saturated oxahydrocarbon of more than 3 carbon atoms. For example, di-n-butyl ether and tetrahydrofuran are suitable.

The polysiloxane to be used, of the general formula $$RO\!-\!\!\left[\begin{array}{c}R\\|\\Si\!-\!O\\|\\R\end{array}\right]_n\!\!-\!R$$

may preferably carry only methyl radicals, but in particular it is also possible for some methyl radicals to be replaced by phenyl radicals. The number of siloxane units n is preferably from 10 to 3,000, so that the viscosity of the polysiloxane is from 1,000 to 500,000, in particular from 10,000 to 200,000, centistokes.

The carrier used in the present invention is a finely divided silica, preferably one having a mean specific pore volume of from 1.5 to 2.0 $cm^3/g$ and a specific surface area of from 200 to 400 $m^2/g$. The mean particle diameter should preferably be from 5 to 200, in particular from 15 to 100, μm. We have found that the commercially available carrier gels conforming to the stated specification are suitable. Starting materials for the aftertreatment of the catalyst intermediate The aluminum compound dissolved in an inert hydrocarbon is of the formula $$Al(R^1)(R^2)X$$

where $R^1$ and $R^2$ are each a saturated $C_1$–$C_{12}$-hydrocarbon radical or chlorine, in particular $C_2$–$C_8$-alkyl, and X is chlorine, hydrogen or alkoxy. For example, diethylaluminum chloride is suitable.

The Lewis bases used are silane derivatives of the formula $$R^1{}_mSi(OR^2)_{4-m}.$$

where m is from 0 to 4 and $R^1$ and $R^2$ are each a $C_1$–$C_{12}$-hydrocarbon radical. Examples are tetraethyl orthosilicate, trimethoxyvinylsilane, diethoxydimethylsilane, trimethylethoxysilane and allyltrimethylsilane.

On the other hand, i is also possible to use dimeric siloxanes of the general formula $$(R^1)_3Si\!-\!O\!-\!Si\!-\!(R^2)_3$$

where $R^1$ and $R^2$ are each $C_1$–$C_{12}$ -alkyl, for example hexamethyl-or hexaethyldisiloxane.

1. CATALYST PREPARATION 1.1 Preparation of the catalyst intermediate

For the preparation of the catalyst impregnation solution, the active components complexed beforehand with an alcohol are dissolved in an oxahydrocarbon so that the ratio of magnesium component (in moles of magnesium) to titanium component (in moles of titanium) is from 1:1 to 4:1, in particular from 1.5:1 to 2.5:1.

The polysiloxane defined above is advantageously added at this point but can also be added at any other point in the dissolution process, so that the weight ratio of polysiloxane to Mg component (calculated as Mg) is from 1:1 to 16:1, in particular from 2:1 to 8:1. For complete homogenization, the solution can also be stirred for from 5 to 30 minutes at from 40 to 60° C.; the ratio of the stated starting materials to one another must in any case be chosen so that the resulting solution can be further used in the form of a single phase and without a relatively high solids content.

Depending on the purity of the starting materials, it is advisable to filter the solution before combination with the carrier. The weight ratio of silica gel to magnesium component (calculated as magnesium) depends on the desired productivity of the catalyst and should not exceed 50 or fall below 20. The ratio is preferably from 40:1 to 30:1.

After combination, it is advantageous to keep the entire mixture at from 20° C. to a few degrees below the boiling point of the solution, but not above 80° C., for from 10 to 90, in particular from 30 to 60, minutes before evaporating down the suspension formed.

During the evaporation process, the temperature of the suspension should initially be kept at from 60° to 80° C., so that up to about 50% by volume of the solvent used is distilled off, either under inert gas or under reduced pressure. For complete removal of all volatile components, it is advantageous to reduce the pressure slowly to a final reduced pressure of about 10 mbar. To prevent premature decomposition of the active components on the carrier, the temperature of the material to be dried should be reduced to 50° C. or lower after about 70–90% by volume of the solvent used have been removed.

Constantly maintaining the temperature and pressure conditions defined above during the evaporation process ensures the preparation of an extremely homogeneous and very free-flowing catalyst intermediate. Furthermore, the formation of any type of wall deposit in the drying apparatus to be used is prevented. Examples of suitable drying apparatuses are rotary evaporators or double-cone driers.

1.2 Aftertreatment of the catalyst intermediate

The extreme homogeneity of the catalyst intermediate described in 1.1 was confirmed by investigations under the optical microscope. It can therefore be assumed that all active components have been completely applied to the $SiO_2$ carrier particle or that there are no troublesome secondary precipitates or agglomerates in addition to the material present on the carrier.

In the subsequent aftertreatment step, this state of the catalyst intermediate which has already been achieved must not be changed.

For this purpose, a solution is initially prepared from 100 parts by volume of an inert hydrocarbon, 10–100, preferably 30–60, parts by volume, based on a roughly 35% strength by weight solution of the aluminum component defined above, in an inert hydrocarbon, and 1–30, preferably 2–15, parts by volume of the silicon compound described above, so that the volume ratio of aluminum component to silane compound is from 40:1 to 2:1, preferably from 25:1 to 3:1.

The resulting solution is then cooled to a temperature of from $-80°$ to $+10°$ C., in particular from $-20°$ to $\pm 0°$ C.

The catalyst intermediate described above, in solid form, is added to this solution. The resulting suspension is slowly heated to 20–80° C., in particular 40–60° C., and is left at this temperature for from 15 to 300, in particular from 30 to 150, minutes in order to complete the reaction.

The solid-phase product can be used in the form of the resulting suspension as a transition metal catalyst component, after being washed with an inert hydrocarbon by digestion or filtration.

If desired, it is however also possible to isolate the solid-phase product before using it as a catalyst component, a possible method of isolation being the following: the product is separated from the liquid phase by filtration and is washed with an inert hydrocarbon, after which it is dried in an inert gas stream or under reduced pressure.

1.3 Polymerization

The novel titanium-containing catalyst systems can be used in conventional polymerization processes for the preparation of the polymer stated there.

It should be pointed out in particular that the novel catalyst systems are mainly suitable for the preparation of copolymers of ethylene with α-olefins in the gas-phase fluidized-bed process. The combination of high catalyst productivity, excellent polymer morphology and extremely little tendency of the polymers to stick, even at densities below 0.910 g/cm$^3$, are particularly advantageous for reliable and profitable operation of such a plant.

The advantages achieved with the invention consist in particular in the fact that the novel catalysts give low density ethylene polymers having very small soluble polymer fractions in combination with good morphology. Further advantages are that the novel catalysts have good pourability in combination with high productivity and that films consisting of the ethylene polymers obtained show little tendency to block.

EXAMPLE 1

(a) Preparation of the catalyst intermediate 3.3 g of anhydrous $MgCl_2$ are introduced into a solution of 100 ml of tetrahydrofuran and 12 ml of ethanol and the mixture is heated until all of the $MgCl_2$ has dissolved and sediment is no longer detectable.

5 g of silicone oil (polysiloxane, viscosity 12,500 cSt), 8.5 g of Stauffer AA ($\hat{=}$ $TiCl_3$ . 1/3 $AlCl_3$) . 5.33 isopropanol and 25 g of Stauffer AA silica gel (Grace Type 332, 20–45 μm) are added in succession to this solution.

The suspension obtained is evaporated to dryness in a rotary evaporator as described above.

41 g of catalyst intermediate are obtained.

(b) Aftertreatment of the catalyst intermediate

For this purpose, 23.4 g of the catalyst intermediate obtained above are added to a solution of 100 ml of n-heptane, 45.0 ml of diethylaluminum chloride (DEAC) and 9.0 ml of trimethylethoxysilane (TMES) at $-5°$ C., at a rate such that the internal temperature does not exceed 0° C. At this temperature, the suspension is left for 30 minutes. It is then heated to 50° C. To complete the reaction, the mixture is stirred for a further 90 minutes while maintaining the temperature. The supernatant solution is decanted and the residue is washed with three times 35 ml of n-heptane, after which the catalyst is dried. Yield: 20 g.

(c) Polymerization

The copolymerization of ethylene and but-1-ene using the catalyst component described above is carried out in a 1 l stirred autoclave. For this purpose, the said autoclave is charged with 250 ml of isobutane, 130 ml of butene and 0.5 ml of a 1 N triisobutylaluminum solution (TiBA) in n-heptane. The hydrogen partial pressure is 1 bar and the temperature is 75° C. The total pressure is brought to 28 bar by means of ethylene. Further data on the polymer obtained are given in the Table below.

EXAMPLE 2

(a) Catalyst intermediate

The preparation is carried out as in Example 1, except that 11 ml of 2-ethylhexanol are used instead of ethanol and, instead of silicone oil having a viscosity of 12,500 cSt, one having a viscosity of 100,000 cSt is employed. Yield: 44 g.

(b) Aftertreatment

For this purpose, 26.4 g of catalyst intermediate are reacted with 37.5 ml of DEAC and 9 ml of TMES in the manner described above. Yield: 22.5 g.

(c) Polymerization Similar to Example 1.

EXAMPLE 3

(a) Catalyst intermediate

The preparation is carried out as in Example 1, except that 16 ml of dodecanol are used instead of ethanol and, instead of silicone oil having a viscosity of 12,500 cSt, one having a viscosity of 500,000 cSt is employed. Yield: 46.0 g.

(b) Aftertreatment

For this purpose, 27.6 g of catalyst intermediate are reacted with 37.5 ml of DEAC and 7.5 ml of TMES as described above. Yield: 22.0 g.

(c) Polymerization

Similar to Example 1.

EXAMPLE 4

(a) Catalyst intermediate

A solution of 60 ml of THF, 8.1 ml of n-butanol and 3.25 g of Stauffer AA (TiCl$_3$ . 1/3 AlCl$_3$) is added to a solution of 60 ml of THF, 11 ml of 2-ethylhexanol and 3.3 g of MgCl$_2$. Thereafter, 5 g of silicone oil (100,000 cSt) are added and the resulting solution is applied to 25 g of silica gel. Yield: 43.0 g.

(b) Aftertreatment Similar to Example 3, but using 25.8 g of catalyst intermediate.

(c) Polymerization Similar to Example 1.

EXAMPLE 5

3.3 g of anhydrous MgCl$_2$ are added to a solution of 100 ml of di-n-butyl ether and 25 ml of 1-butanol and the mixture is stirred at elevated temperatures until dissolution is complete.

The further process steps ar carried out similarly to Example 1a to 1c.

EXAMPLE 6

6a, c) are similar to 2a, 1c.

(b) Aftertreatment

The aftertreatment is carried out as in Example 2b, except that 1.6 ml of trimethoxyvinylsilane are used instead of trimethylethoxysilane. Yield: 23.2 g.

EXAMPLE 7

7a, c) are similar to 2a, 1c.

(b) Aftertreatment

Similar to 6b, but using 4.5 ml of allyltri-methylsilane.

COMPARATIVE EXAMPLE 1

As for Example 2, but without polysiloxane in the catalyst intermediate.

This Comparative Example shows that the use of a high molecular weight polysiloxane substantially reduces the content of soluble fractions. However, it does not act as a polymeric binder, as, for example, the polymers used in U.S. Pat. No. 4,521,573, since the bulk density and the fines are not influenced.

COMPARATIVE EXAMPLE 2

As for Example 2, but without polysiloxane; the aftertreatment is carried out similarly to EP-A-225 452 cited at the outset, i.e. by suspending the intermediate and adding the alkyl/silane solution at elevated temperatures.

COMPARATIVE EXAMPLE 3

As for Example 2, but without polysiloxane; the aftertreatment is carried out similarly to EP-A-0 043 220 cited at the outset, with the exclusive use of DEAC and treatment at elevated temperatures.

The product morphology is as for Comparative Example 2, and soluble fractions are substantially increased.

COMPARATIVE EXAMPLE 4

As for Comparative Example 2, but using polysiloxane in the intermediate.

The product morphology is as for Comparative Example 2, but there is a smaller amount of soluble fractions.

COMPARATIVE EXAMPLE 5

As for Comparative Example 3, but using polysiloxane in the intermediate.

The product morphology is as for Comparative Example 3, but there is a smaller amount of soluble fractions.

TABLE

| | Density[1] | Melt flow index[2] | Productivity[3] | Bulk density[4] | Soluble fractions[5] | Fines[6] | Very fine material[7] |
|---|---|---|---|---|---|---|---|
| Example | | | | | | | |
| 1 | 0.922 | 1.1 | 10.800 | 370 | 0.3 | 5.0 | 0.0 |
| 2 | 0.920 | 1.1 | 11.500 | 390 | 0.3 | 3.8 | 0.0 |
| 3 | 0.919 | 1.0 | 9.700 | 360 | 0.5 | 6.0 | 0.0 |
| 4 | 0.920 | 1.0 | 10.500 | 360 | 0.4 | 7.2 | 0.0 |
| 5 | 0.919 | 1.0 | 11.000 | 400 | 0.2 | 6.0 | 0.0 |
| 6 | 0.921 | 0.9 | 11.100 | 380 | 0.7 | 8.0 | 0.0 |
| 7 | 0.920 | 0.9 | 10.800 | 370 | 0.6 | 8.5 | 0.0 |
| Comp. Example | | | | | | | |
| 1 | 0.919 | 0.9 | 13.000 | 380 | 1.7 | 6.2 | 0.0 |
| 2 | 0.920 | 1.0 | 13.800 | 290 | 1.5 | 19.3 | 0.6 |
| 3 | 0.919 | 1.1 | 12.400 | 270 | 3.7 | 16.2 | 0.3 |
| 4 | 0.920 | 1.0 | 14.200 | 270 | 0.7 | 17.6 | 0.5 |
| 5 | 0.920 | 1.0 | 12.100 | 280 | 1.7 | 14.8 | 0.4 |

[1] In g/cm$^3$ according to DIN 53,479
[2] MFI 190/2.16 in g/10 min according to DIN 53,735
[3] In g of polymer per g of catalyst
[4] In g/cm$^3$ according to DIN 43,468
[5] In % of the polymer for 1 g of polymer in 5 g of n-heptane at 20° C. in the course of 2 hours
[6] Fraction of the polymer having a particle size of less than 0.5 mm, in %
[7] Similar to (6), but smaller than 0.1 mm

We claim:

1. A process for the preparation of a catalyst for the copolymerization of ethylene by the gas-phase fluidized-bed method using an active component consisting of a titanium-containing compound of the formula $TiCl_3 \cdot nAlCl_3$ where n is from 0 to 0.5 and magnesium-containing compound of the formula $MgX_2$ where X is chlorine, bromine or iodine, a polysiloxane, a carrier comprising finely divided silica, an alkylaluminum compound of the formula $Al(R^1)(R^2)X$ wherein $R^1$ and $R^2$ are each a saturated $C_1$-$C_{12}$-hydrocarbon radical or chlorine, and X is chlorine, hydrogen or alkoxy and a Lewis base, wherein the titanium-containing active component and magnesium-containing active component, reacted with an alcohol as a complexing agent, is applied to the silica from homogeneous solution, in the presence of the polysiloxane, by evaporating the solvent, and the resulting homogeneous catalyst intermediate is then preactivated by treatment with the alkylaluminum compound and the Lewis base in an inert hydrocarbon solution.

2. The process of claim 1, wherein, during evaporation of the solvent under inert gas or under reduced pressure, up to 50 percent by volume of the solvent is removed at from 60° to 80° C. and the remainder is removed down to a final reduced pressure of 5 mbar at not more than 50° C.

3. The process of claim 1, wherein the solvent is a saturated oxahydrocarbon.

4. The process of claim 1, wherein the carrier silica has a mean specific surface area of from 200 to 400 $m^2/g$, a mean particle diameter of from 50 to 200 $\mu m$ and a means specific pore volume of from 1.5 to 2.0 $cm^3/g$.

5. The process of claim 1, wherein the Lewis base is a silane derivative of the formula $[R^1{}_mS{-}i(OR^2)_{4-m}]R^1{}_mSi(OR^2)_{4-m}$ wherein m is from 0 to 4 and $R^1$ and $R^2$ are each a $C_1$-$C_{12}$-hydrocarbon radical, or a dimeric siloxane of the formula $(R^1)_3$-Si-O-Si$(R^2)_3$, where $R^1$ and $R^2$ are each $C_1$-$C_{12}$-alkyl.

6. A catalyst for the copolymerization of ethylene by the gas-phase fluidized-bed method, prepared as defined in claim 1.

7. The process of claim 1, wherein the polysiloxane is of the formula

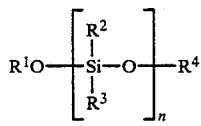

where $R^1$, $R^2$, $R^3$ and $R^4$ may be identical or different and are one or more methyl radicals or one or more phenyl radicals and n is an integer of from 10 to 3,000.

8. A process for preparing a catalyst for the copolymerization of ethylene by the gas-phase fluidized-bed method comprising (a) dissolving, as active components, a titanium-containing compound of the formula $TiCl_3 \cdot nAlCl_3$ where n is from 0 to 0.5 and a magnesium-containing compound of the formula $MgX_2$ where X is chlorine, bromine or iodine, said active components being complexted with an alcohol of the formula R-OH where R is an aliphatic $C_2$-$C_{14}$ hydrocarbon radical, in a saturated oxahydrocarbon solvent so that the ratio of magnesium component in moles of magnesium to titanium component in moles of titanium is from 1:1 to 4:1, and adding a polysiloxane of the formula

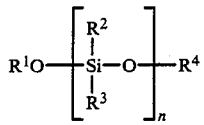

where R1, $R^2$, $R^3$ and $R^4$ are identical or different and are methykl or phenyl radicals and n is an integer of from 10 to 3,000 so that the weight ratio of polysiloxane to magnesium comopnent calculated as magnesium is from 1:1 to 16:1, to form a homogeneous solution; applying the homogeneous solution to a finely divided silica carrier, the carrier silica having a mean specific surface area of from 200 to 400 $m^2/g$, a mean particle diameter of from 5 to 200 $\mu m$ and a means specific pore volume of from 1.6 to 2.0 $cm^3/g$; and evaporating off the solvent to form a solid homogeneous catalyst intermediate, (b) adding the solid homogeneous catalyst intermediate to an inert hydrocarbon solution containing an alkylaluminum compound of the formula $Al(R^1)(R^2)X$ where $R^1$ and $R^2$ are each a saturated $C_1$-$C_{12}$-hydrocarbon radical or chlorine and X is chlorine, hydrogen or alkoxy and a Lewis base, the Lewis base being a silane derivative of the formula $R^1{}_mSi(OR^2)_{4-m}$ where m is from 0 to 4 and $R^1$ and $R_2$ are each a $C^{1-}C_{12}$-hydrocarbon radical, or a dimeric siloxane of the formula $(R^1)_3$—Si—O—Si$(R^2)_3$ where $R^1$ and $R^2$ are each a $C_1$-$C_{12}$-alkyl to form a suspension containing a solid-phase catalyst component and a liquid-phase component.

9. The process of claim 8, wherein the solid-phase catalyst component is separated from the liquid-phase component of the suspension by filtration, the solid-phase component is washed with an inert hydrocarbon and dried under an inert gas stream under reduced pressure.

10. The process of claim 8, wherein the magnesium component is anhydrous $MgCl_2$.

11. The process of claim 8, wherein the polysiloxane is added to the solvent during dissolution of the active ingredients.

12. The process of claim 8, wherein the solvent is evaporated under inert gas or under reduced pressure, up to 50 percent by volume of the solvent is removed from 60° to 80° and the remainer is removed down to a final reduced pressure of 5 mbar at not more than 50° C.

13. The process of claim 8, wherein the radicals $R^1$, $R^2$, $R^3$ and $R^4$ of the polysiloxane are each a methyl radical.

14. The process of claim 8, wherein the saturated oxahydrocarbon is di-n-butyl-ether or tetrahydrofuran.

15. The process of claim 8, wherein the alkylaluminum compound is diethylaluminum chloride.

16. The process of claim 8, wherein the Lewis base is tetraethyl orthosilicate, trimethoxyvinylsilane, diethoxydimethylsilane, trimethylethoxysilane, alkyltrimethylsilane, hexamethyl disiloxane or hexaethydisiloxane.

17. The process of claim 8, wherein the complex of active component and alcohol are formed in situ.

18. A catalyst for the copolymerization of ethylene by the gas-phase fluidized-bed method, prepared as defined in claim 8.

19. A catalyst for the copolymerization of ethylene by the gas-phase fluidized-bed method, prepared as defined in claim 9.

* * * * *

UNITED STATES PATENT AND TRADEMARK OFFICE
CERTIFICATE OF CORRECTION

PATENT NO. : 4,970,184

DATED : November 13, 1990

INVENTOR(S) : Eckard SCHAUSS et al.

It is certified that error appears in the above-identified patent and that said Letters Patent is hereby corrected as shown below:

IN THE CLAIMS

Claim 8, Line 9: "complexted" should read --complexed--

Claim 8, Line 18: "methykl" should read --methyl--

Claim 8, Line 37: "$C^1-C_{12}$ -hydrocarbon" should read --$C_1-C_{12}$-hydrocarbon--

Claim 12, Line 4: "remainer" should read --remainder--

Signed and Sealed this

Twenty-sixth Day of May, 1992

Attest:

DOUGLAS B. COMER

*Attesting Officer*  *Acting Commissioner of Patents and Trademarks*